(12) United States Patent
Rich et al.

(10) Patent No.: US 6,684,811 B2
(45) Date of Patent: Feb. 3, 2004

(54) METHOD OF MAKING A TUBULAR ELEMENT AND PRODUCT, PARTICULARLY BIRD FEEDER HOPPER, PRODUCED THEREBY

(75) Inventors: Christopher T. Rich, Lancaster, PA (US); Clay E. Tully, Hummelstown, PA (US)

(73) Assignee: Woodstream Corporation, Lititz, PA (US)

( * ) Notice: Subject to any disclaimer, the term of this patent is extended or adjusted under 35 U.S.C. 154(b) by 21 days.

(21) Appl. No.: 10/073,951

(22) Filed: Feb. 14, 2002

(65) Prior Publication Data

US 2003/0150390 A1 Aug. 14, 2003

(51) Int. Cl.[7] .............................................. A01K 39/012
(52) U.S. Cl. ...................................... 119/52.2; 119/52.1
(58) Field of Search ............................ 119/51.01, 52.2, 119/52.3, 52.4, 57.8, 57.9

(56) References Cited

U.S. PATENT DOCUMENTS

| | | | | |
|---|---|---|---|---|
| 5,701,842 A | * | 12/1997 | Whittles | 119/52.2 |
| 5,826,540 A | * | 10/1998 | Bridges | 119/52.3 |
| 5,964,183 A | * | 10/1999 | Czipri | 119/52.3 |
| 6,213,054 B1 | * | 4/2001 | Marshall | 119/57.8 |

OTHER PUBLICATIONS

Top Flight Lifetime Feeders, Fortress Squirrel Proof Bird Feeder, 5108, 1997.
Gardensong Feeders, Coach Lamp Bird Feeder No. 469–9 and Carriage Lamp Bird Feeder No. 470–6, p. 11.
Terra Cotta, Bird Feeders No. 4101–4 amd 4106–4, p. 14.
Top Flight Lifetime Feeders, Fortress Triple Tube Bird Feeder No. 5124–2, Bird Feeder 5101–4 and Finch Feeder No. 5102–4, 5108.

* cited by examiner

Primary Examiner—Charles T. Jordan
Assistant Examiner—Judith A. Nelson
(74) Attorney, Agent, or Firm—Jacobson Holman PLLC

(57) ABSTRACT

A method of making a tubular member such as a bird feeder hopper having offset members extending integrally from the inside surface of the peripheral wall thereof into an internal cavity. A sheet-like member is initially formed with a plurality of wall sections interconnected by integral hinges and the offset members integrally formed on one surface thereof. The sheet-like element can then be folded or pivoted about the integral hinges to form the peripheral wall of the tubular member, with the offset members extending into the internal cavity defined thereby and the edge portions of the end sections secured as by heat sealing, complementary locking members, or a combination thereof.

31 Claims, 4 Drawing Sheets

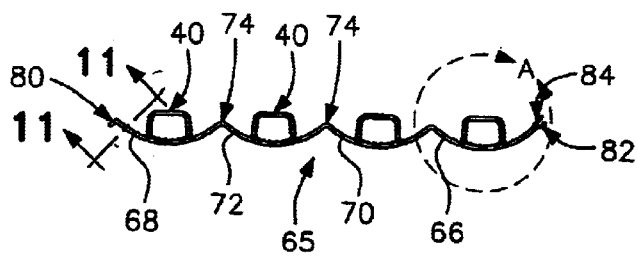
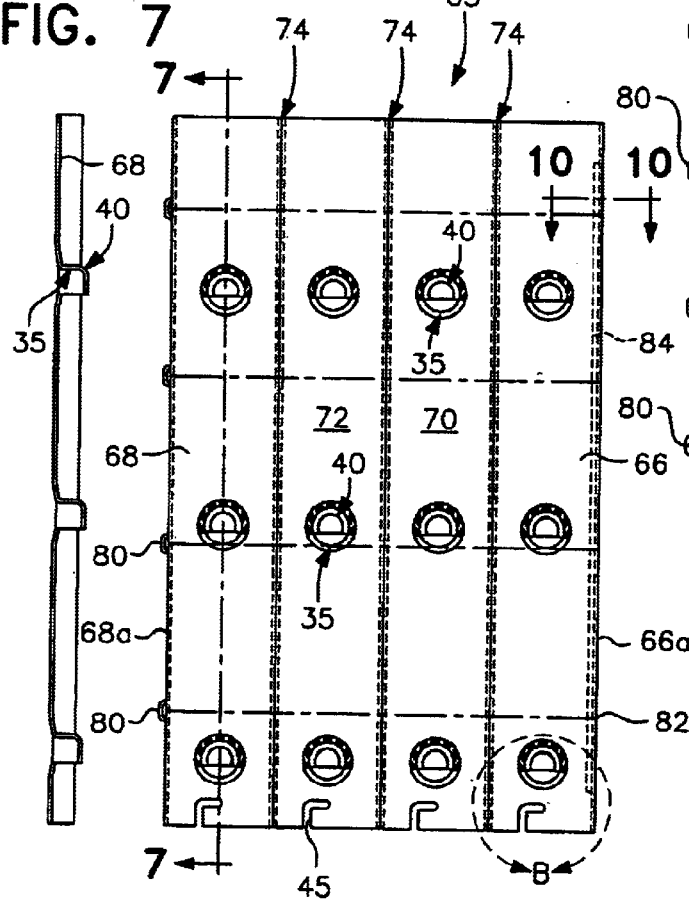
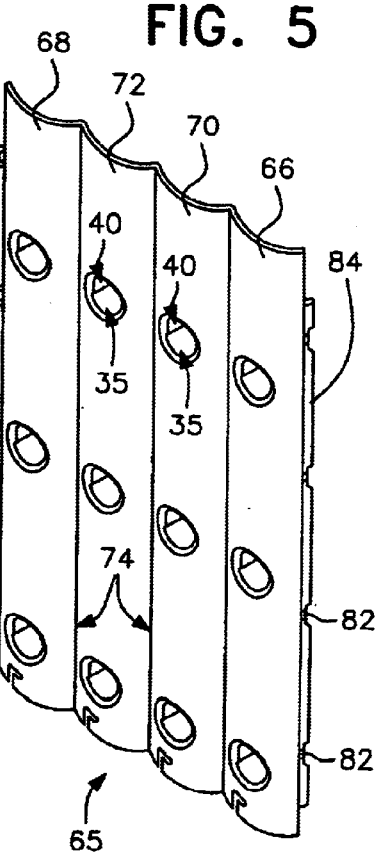

METHOD OF MAKING A TUBULAR ELEMENT AND PRODUCT, PARTICULARLY BIRD FEEDER HOPPER, PRODUCED THEREBY

BACKGROUND OF THE INVENTION

1. Field of the Invention

This invention relates to methods of making tubular elements, and relates more particularly to the production of a tubular element defining an internal cavity and having at least one offset member extending from its inside surface into the internal cavity. Products of this nature can be of various sizes and shapes and made from different materials, but this invention is particularly concerned with a process for making a polymeric tubular element, such as a cylindrical tube, wherein the inwardly extending offset members are integrally formed with the peripheral wall.

One particular product of this nature is the hopper commonly found in commercially available bird feeders which comprises a cylindrical transparent plastic tube with a multiplicity of spaced feed ports or openings intermediate the top and bottom portions of the tube, commonly surrounded by a housing including a wire cage or the like to minimize access to the feed ports by squirrels and other small animals that tend to frighten off birds, quickly depleting the supply of bird food, and even destroying the hopper. The hoppers in such bird feeders are normally formed of a thermoplastic material such as polypropylene and include internally extending semicircular caps adapted to preclude the outflow of bird food from the hopper reservoir or internal cavity while permitting birds to access the bird food which flows by gravity to the feed ports under the cap members.

2. Description of the Related Art

The manufacture of tubular products with internally extending offset members, such as bird feeder hoppers having cap members adjacent each feed port extending into the hopper cavity, has caused significant difficulties. A simple and inexpensive method to manufacture a cylindrical element, which is the peripheral wall of the hopper, would be by injection molding of a thermoplastic polymer. However, the internally extending feed port cap members cannot be effectively formed integrally with the cylindrical peripheral wall because the internal molding element or core necessary to form the cap members would be impossible, or at the very least, practically impossible, to remove after the molding operation was complete. Therefore, heretofore the cap members have been molded as separate elements, independent of the peripheral wall of the hopper and subsequently secured internally of the hopper at each feed port, either adhesively or by a snap fit engagement of the cap member with the peripheral wall of the hopper. It is evident that such a process is time consuming, labor intensive, commercially inefficient and unnecessarily expensive.

SUMMARY OF THE INVENTION

With the foregoing in mind, it is a primary object of this invention to provide a method of making a tubular member, such as a bird feeder hopper, which enables the internally offset members, such as the feed port cap members, to be formed integrally with the peripheral wall by injection molding or the like, without the problems attendant to prior art attempts to integrally provide structures of this type.

A further object of this invention is the provision of a method for making a tubular member including such internally offset elements by first forming a sheet-like element, including a plurality of wall sections interconnected by integral hinges, with the offset members integrally formed with one or more of the wall sections, and then pivoting or folding the wall sections about the integral hinges to form a peripheral wall, and interconnecting the mating edges of the sheet-like element to form the tubular member.

Yet another object of this invention is the provision of tubular products, such as bird feeder hoppers of the type described, with integrally formed, internally offset members, such as the semicircular cap members commonly found at each feed port on a bird feeder hopper to protect against loss of bird food from the internal cavity formed by the peripheral wall through the feed ports.

Another object of this invention is the provision of an injection molding technique for forming a sheet-like element with a plurality of wall sections each having a preselected thickness, the wall sections being integrally interconnected to each other by portions which are thinner than the thickness of the wall sections they interconnect and thereby form integral hinges, to enable the wall sections to be bent or pivoted about the hinges to produce the tubular product.

A still further object of this invention is the provision of integral locking members on the edge portions of the end wall sections of such sheet-like elements so that when the wall sections are folded about their integral hinges to produce the peripheral wall, the complementary locking members can be interengaged to retain the sheet-like member in its tubular form without the need for extraneous tools. Alternatively or additionally, the end sections of the sheet-like member may be interconnected during the manufacturing process by heat sealing the edge portions to each other.

More generally, this invention is directed to a method of making a tubular member, such as a bird feeder hopper, and the products so produced, in a simple, inexpensive and commercially efficient manner.

BRIEF DESCRIPTION OF THE DRAWINGS

These and other objects, features and many of the attendant advantages of the invention will be better understood upon a reading of the following detailed description when considered in connection with the accompanying drawings, wherein like parts in each of the several figures are identified by the same reference numerals, and wherein:

FIG. 5 is a perspective view of a sheet-like element made, as by injection molding, to provide a starting material in the production of the bird feeder hopper shown in FIGS. 1–4;

FIG. 6 is a front elevational view of the element of FIG. 5.

FIG. 7 is a vertical section therethrough taken along lines 7—7 of FIG. 6;

FIG. 8 is a top plan view of the sheet-like element of FIGS. 5–7;

Like reference characters refer to like parts throughout the several views of the drawings.

DETAILED DESCRIPTION OF THE PREFERRED EMBODIMENTS

Figure 1:
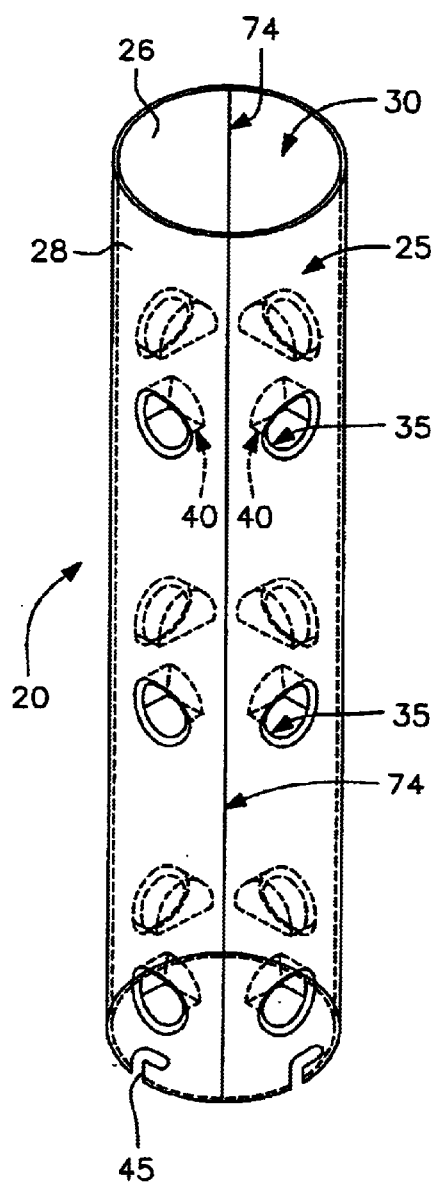
FIG. 1 is a perspective view of one form of tubular member, namely a bird feeder hopper, with internally extending feed port cap members shown partially in dotted lines.
Figure 3:
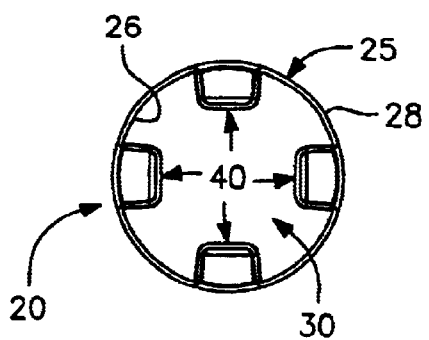
FIG. 3 is a top plan view thereof.
Figure 2:
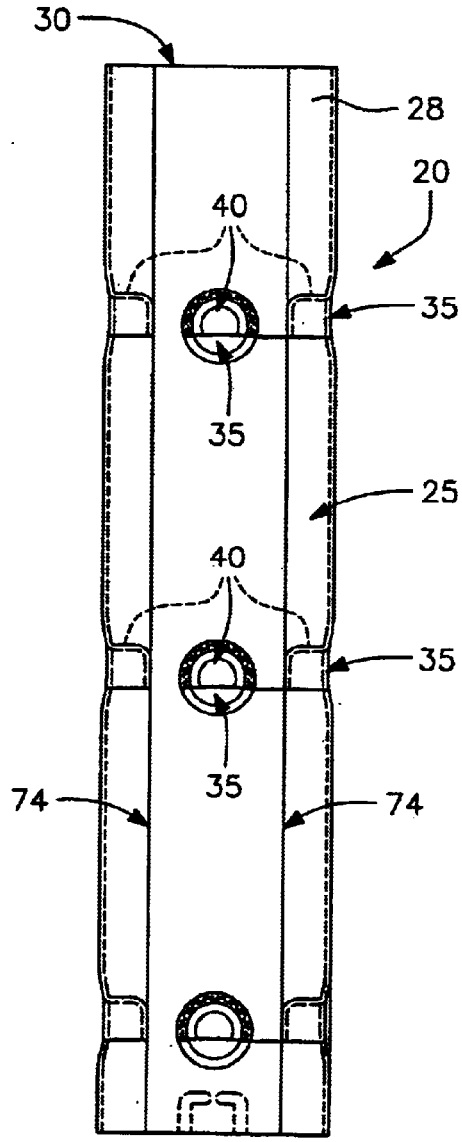
FIG. 2 is a side elevational view of the hopper of FIG. 1.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring now to the drawings, a tubular member that can be conveniently made according to the instant inventive concepts is illustratively shown as a bird feeder hopper at 20. Although the bird feeder hopper 20 is only one form of tubular member that can be efficiently made using the process of this invention, it is to be understood that the concepts disclosed herein enable the production of a tubular member of any size or shape from a variety of materials with integral offset elements extending into the cavity defined by the peripheral wall thereof. However, for ease of understanding, this invention will be primarily described with reference to the production of a bird feeder hopper such as shown at 20 of the type adapted for incorporation into a unique bird feeder constructions as disclosed in co-pending, commonly assigned, application Ser. No. 10/074,032 filed simultaneously herewith and entitled "BIRD FEEDER WITH REMOVABLE BIRD SEED RESERVOIR", the subject matter of which is incorporated herein in its entirety by reference, since this invention is particularly adapted for use in the production of a product of that nature.

The hopper 20 includes a peripheral wall 25 defining an internal cavity 30 for the reception of a quantity of bird food (not shown). A plurality of feed ports 35 are formed in the peripheral wall 25 between the inside and outside surfaces 26, 28 thereof, with a semicircular cap member 40, integrally formed by the method of this invention, extending into the internal cavity 30 at each feed port 35.

Obviously, the size and shape of the hopper 20, as well as the number of feed ports 35 and associated cap members 40 may vary without departing from the instant inventive concepts. Moreover, the tubular member 25 can be provided with any other indentations, protrusions, cut outs or the like, such as shown illustratively at 45.

Figure 4:
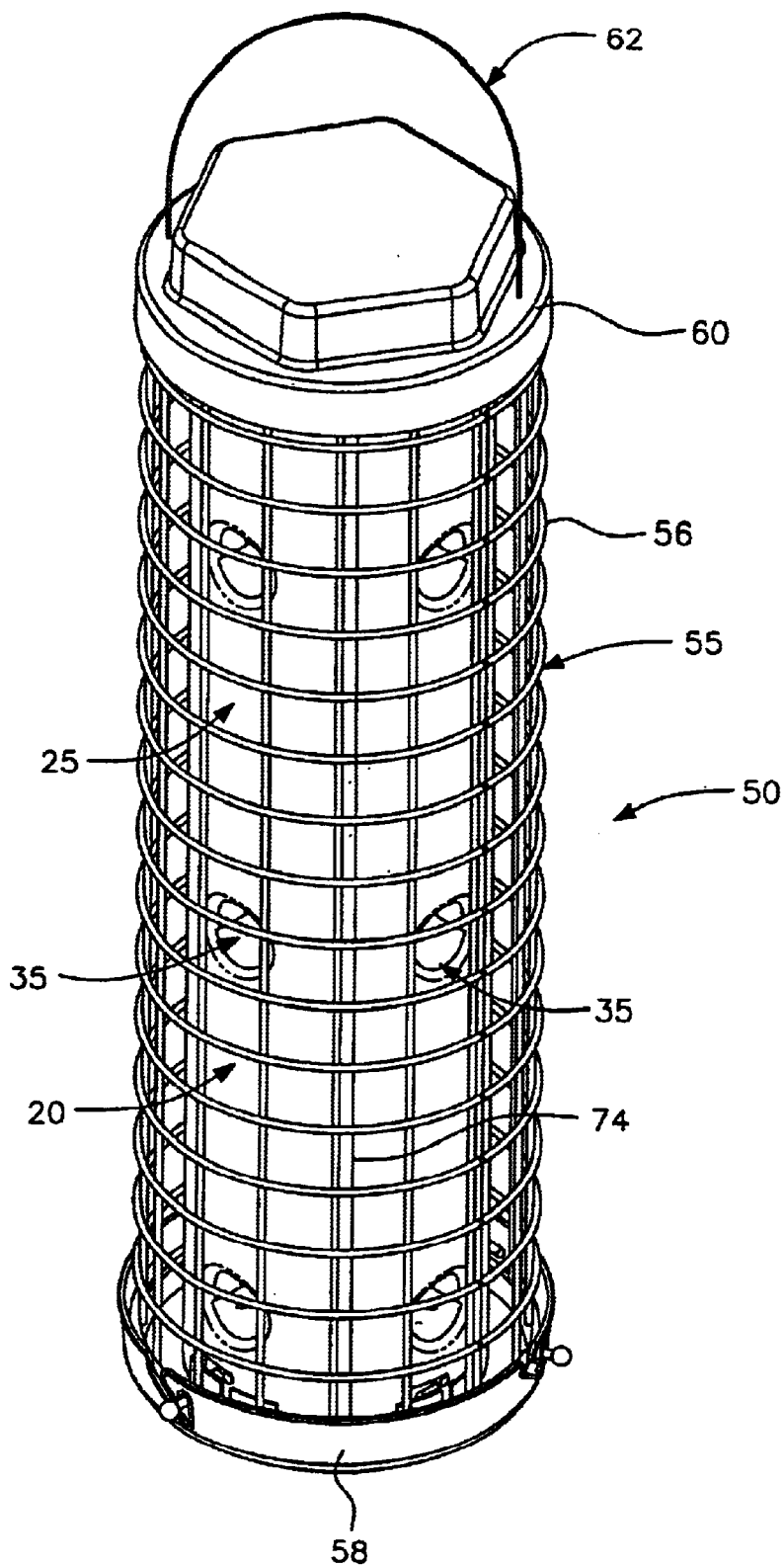
FIG. 4 is a perspective view of an exemplary bird feeder incorporating a hopper made according to the instant inventive concepts.
Figure 9:
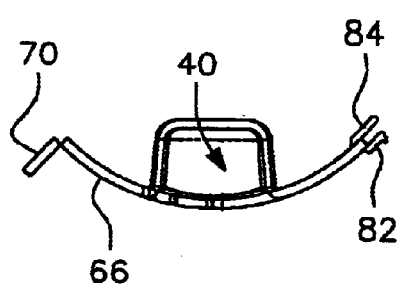
FIG. 9 is an enlarged detail showing of the portion of the sheet-like element circled in dotted lines at A in FIG. 8.
Figure 10:
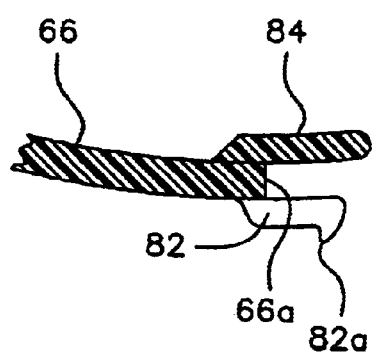
FIG. 10 is an enlarged fragmentary cross-sectional view showing one form of latch member taken along lines 10—10 of FIG. 6.
Figure 12:
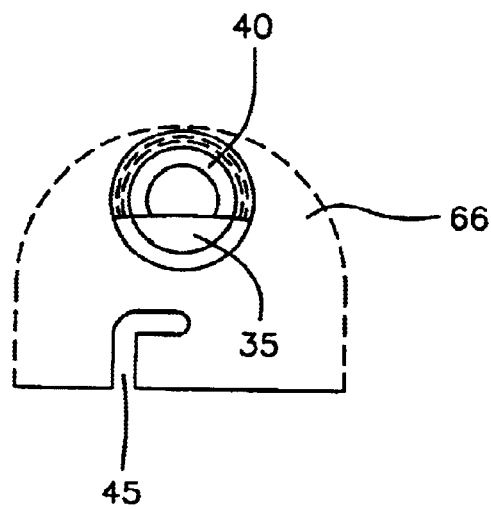
FIG. 12 is an enlarged detailed showing of the portion of the sheet-like element circled in dotted lines at B in FIG. 6.
Figure 11:
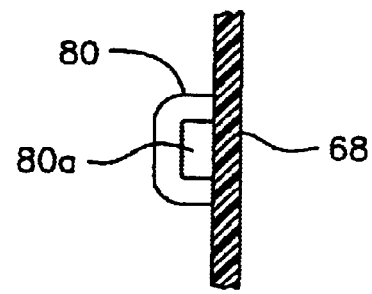
FIG. 11 is an enlarged fragmentary cross-sectional view showing a complementary latch member taken along lines 11—11 of FIG. 8.

In FIG. 4, the hopper 20 will be seen in a bird feeder 50 including a housing 55 in the nature of a wire cage 56 with a base 58, a cap 60 and a hanger 62. The bird feeder 50 is of the type shown in the aforementioned co-pending application, and is illustrative of the environment in which a tubular member, such as the hopper 20, made by the instant inventive concepts, will find commercial use.

As noted hereinabove, attempts to integrally form a tubular member such as the hopper 20 by injection molding or the like would be impractical, if not impossible, because the internal core needed to define the cap members 40 could not be removed from the molding apparatus once the plastic material had set. For that reason, according to this invention, the tubular member or hopper 20 is initially formed as a sheet-like element seen in detail at 65 in FIGS. 5–12. The element 65 comprises a plurality of wall sections, including end sections 66, 68 and intermediate sections 70, 72 integrally interconnected by thinned-out portions which form self-hinges or integral hinges at 74 to enable the sheet-like member 65 to be folded or pivoted about the integral hinges 74 to form peripheral wall 25 of the tubular member 20.

The edge portions 66a and 68a of the end sections 66 and 68, respectively, can then be juxtaposed and simply heat-sealed in a well known manner to secure the sheet-like member 65 in the tubular form. Alternatively, or additionally, complementary locking members may be provided on the edge portions which can be snap-fit or otherwise interengaged to preclude the disassembly of the peripheral wall 25 of the tubular member 20. Exemplary locking members are seen as the integrally formed U-shaped bails 80 shown in enlarged detail in FIG. 11, and the integrally formed complementary latches 82 shown in enlarged form in FIG. 10. The latches 82 can be snappingly engaged in the openings 80a formed by the bails 80 with the flexible offset edges 82a of the latches 82 sliding through the opening 80a of the bail 80 during engagement, and thereafter limiting accidental disengagement of the locking members.

If desired, an offset flange 84 may also be provided internally of the edge portions 68a of the end section 68 to facilitate positioning, and enhance locking, of the mating edge portions 66a, 68a.

All of the elements of the hopper 20 discussed hereinabove, can be integrally formed by injection molding of a thermoplastic polymer such as polypropylene in a well known manner. Those skilled in the art are familiar with the formation of thinner sections such as shown at 74 to provide integral hinges, and the integral extrusion of the cap members 40 and the complementary locking members 80, 82, 84 are all well within the ordinary skill of the art.

The use of the terminology "sheet-like element" herein and in the appending claims, is intended to include generally planar elements where the individual wall sections are flat (not shown) or arcuate wall sections as illustrated herein which are particularly adapted for the formation of a peripheral wall in a cylindrical tubular member. Of course, substantially cylindrical peripheral walls can be formed from a multiplicity of planar wall sections integrally interconnected by self-hinges, but the use of arcuate wall sections minimizes the number of individual wall sections necessary to approximate a cylinder and produces a more aesthetic product.

It will now be seen that this invention provides a method of making a tubular member with internally offset elements integrally formed with the peripheral wall by the simple and well known process of extrusion molding, or by any other molding or sheet-shaping techniques. For example, the sheet-like element 65 can be preformed from a sheet material, with the integral hinges produced by creases or spaced perforations, and with the locking members and internally offset members molded or vacuum-formed using techniques well known to those skilled in the art.

The foregoing descriptions and drawings should be considered as illustrative only of the principles of the invention. Numerous applications of the present invention will readily occur to those skilled in the art. Therefore, it is not desired to limit the invention to the preferred embodiments or the exact construction and operation shown and described. Rather, all suitable modifications and equivalents may be resorted to, falling within the scope of the invention.

What is claimed is:

1. In a method of making a tubular member including a peripheral wall having an inside surface defining an internal cavity with at least one offset member extending from the inside surface of the peripheral wall into the internal cavity, the improvement which comprises forming a sheet-like element including a plurality of wall sections interconnected by integral hinges, said wall sections including first and second opposed end sections each having free edge portions, and at least one intermediate section interposed between said end sections, said wall sections having inner surfaces which together will define the inside surface of the peripheral wall, forming at least one offset member integral with said sheet-like element and extending from said inner surface of at least one of said wall sections, pivoting said wall sections of said sheet-like element about said integral hinges to juxtapose said edge portions of said end sections and thereby form a peripheral wall with said at least one offset member extending into the internal cavity defined thereby, and connecting said edge portions of said end sections of said sheet-like member to each other to form the tubular member.

2. The improvement of claim 1, wherein the sheet-like element is formed of a thermoplastic polymer by injection molding.

3. The improvement of claim 2, wherein said thermoplastic polymer is polypropylene.

4. The improvement of claim 1, wherein said wall sections each have a thickness and said integral hinges comprise portions of said sheet-like element between and interconnecting said wall sections, said integral hinge portions of said sheet-like element having a thickness less than the thickness of the wall sections they interconnect.

5. The improvement of claim 1, wherein said tubular member is generally cylindrical, and each of said wall sections is arcuate.

6. The improvement of claim 5, wherein said sheet-like element comprises a pair of elongated, generally rectangular, end sections and a pair of elongated, generally rectangular, intermediate sections, an integral hinge interconnecting elongated edge portions of said first end section and one of said intermediate sections, an integral hinge interconnecting elongated edge portions of said second end section to the other of said intermediate sections, and an integral hinge interconnecting the other elongated edge portions of said intermediate sections to each other.

7. The improvement of claim 1, further including forming at least one locking member on said edge portions of said first end section, forming at least one complementary locking member on said edge portions of said second end section, and connecting said edge portions by interengaging said locking members.

8. The improvement of claim 7, wherein said locking members comprise at least one U-shaped bail integral with said edge portions of said first end section and at least one latch integral with said edge portions of said second end section.

9. The improvement of claim 8, comprising forming a plurality of spaced bails on said edge portions of said first end section and forming a plurality of spaced latches on said edge portions of said second end section.

10. The improvement of claim 2, wherein said edge portions of said end sections are connected to each other by heat sealing.

11. The improvement of claim 1, wherein the tubular member is a generally cylindrical hopper for a bird feeder, each of said wall sections including at least one through-opening defining a feed port, and the offset members each comprise a semicircular cap member extending integrally from each of said feed ports into the internal cavity of the hopper.

12. The improvement of claim 11, comprising a plurality of spaced feed ports and integral cap members in each of said wall sections.

13. A method of making a hopper for a bird feeder including a peripheral wall having at least one feed port extending therethrough between an inside surface which defines an internal cavity for receipt of bird food, and an outside surface, with a semicircular cap member extending from the inside surface of the peripheral wall into the internal cavity from each of said feed ports, comprising injection molding a thermoplastic polymer to form a sheet-like element including a plurality of wall sections interconnected by integral hinges, said wall sections including first and second opposed end sections each having free edge portions, and at least one intermediate section interposed between said end sections, said wall sections having inner surfaces which together will define the inside surface of the peripheral wall, forming at least one feed port through said sheet-like member, forming a cap member integral with said sheet-like member and extending from said inner surface at each said feed ports, pivoting said wall sections of said sheet-like element about said integral hinges to juxtapose said edge portions of said end sections and thereby form said peripheral wall with said cap members extending into the internal cavity defined thereby, and connecting said edge portions of said end sections of said sheet-like member to each other to form the hopper.

14. The method of claim 13, wherein said thermoplastic polymer is polypropylene.

15. The method of claim 13, wherein said wall sections each have a thickness and said integral hinges comprise portions of said sheet-like element between and interconnecting said wall sections, said integral hinge portions of said sheet-like element having a thickness less than the thickness of the wall sections they interconnect.

16. The method of claim 13, wherein said hopper is generally cylindrical, and each of said wall sections is arcuate.

17. The method of claim 16, wherein said sheet-like element comprises a pair of elongated, generally rectangular, end sections and a pair of elongated, generally rectangular, intermediate sections, an internal hinge interconnecting elongated edge portions of said first end section and one of said intermediate sections, an integral hinge interconnecting elongated edge portions of said second end section and the other of said intermediate sections, and an integral hinge interconnecting the other elongated edge portions of said intermediate sections to each other.

18. The method of claim 13, further including forming at least one locking member on said edge portions of said first end section, forming at least one complementary locking member on said edge portions of said second end section, and connecting said edge portions of said end sections by interengaging said locking members.

19. The method of claim 18, wherein said locking members comprise at least one U-shaped bail integral with said edge portions of said first end section and at least one latch integral with said edge portions of said second end section.

20. The method of claim 19, comprising forming a plurality of spaced bails on said edge portions of said first end section and forming a plurality of spaced latches on said edge portions of said second end section.

21. The method of claim 13, comprising connecting said edge portions of said end sections to each other by heat sealing.

22. The improvement of claim 13, comprising forming a plurality of spaced feed ports and integral cap members in each of said wall sections.

23. A hopper for a bird feeder comprising a peripheral wall having at least one feed port between an inside surface which defines an internal cavity for receipt of bird food, and an outside surface, a semicircular cap member extending from said inside surface of said peripheral wall into said internal cavity at each feed port, said peripheral wall comprising a sheet-like element including a plurality of wall sections interconnected by integral hinges, said wall sections including first and second opposed end sections each having free edge portions, and at least one intermediate section interposed between said end sections, said wall sections having inner surfaces which together define said inside surface of said peripheral wall, said cap members being integral with said sheet-like element and extending from said inner surface of at least one of said wall sections, said sheet-like element being pivoted about said integral hinges to form said peripheral wall with said at least one cap member extending into said internal cavity of said peripheral wall, and said edge portions of said end sections of said sheet-like member being connected to each other to form the hopper.

24. The hopper of claim 23, wherein the peripheral wall is formed of polypropylene.

25. The hopper of claim 23, wherein said peripheral wall is transparent.

26. The hopper of claim 23, wherein said hopper is generally cylindrical, and each of said wall sections is arcuate.

27. The hopper of claim 23, further including at least one locking member on said edge portions of said first end section and at least one complementary locking member on said edge portions of said second end section, and said locking members being interengaged to interconnect said edge portions of said end sections.

28. The hopper of claim 27, wherein said locking members comprise at least one U-shaped bail integral with said edge portions of said first end section and at least one latch integral with said edge portions of said second end section.

29. The hopper of claim 28, comprising a plurality of spaced bails on said edge portions of said first end section and a plurality of spaced latches on said edge portions of said second end section.

30. The hopper of claim 23, wherein said edge portions of said end sections are heat sealed to each other.

31. The hopper of claim 23, comprising a plurality of spaced feed ports and integral cap members in each of said wall sections.

* * * * *